United States Patent [19]

Yan

[11] 4,162,707
[45] Jul. 31, 1979

[54] METHOD OF TREATING FORMATION TO REMOVE AMMONIUM IONS

[75] Inventor: Tsoung-yuan Yan, Philadelphia, Pa.

[73] Assignee: Mobil Oil Corporation, New York, N.Y.

[21] Appl. No.: 898,760

[22] Filed: Apr. 20, 1978

[51] Int. Cl.² ............ E21B 43/22; E21B 43/27; E21B 43/28

[52] U.S. Cl. ............ 166/252; 166/266; 166/270; 166/271; 166/307

[58] Field of Search ............ 166/250, 266, 270, 271, 166/279, 300, 305 R, 307; 299/4, 5

[56] References Cited

U.S. PATENT DOCUMENTS

| | | | |
|---|---|---|---|
| 2,352,832 | 7/1944 | Gunderson | 166/279 X |
| 2,782,859 | 2/1957 | Garst | 166/307 X |
| 2,964,380 | 12/1960 | Kolodney et al. | 299/5 UX |
| 3,278,232 | 10/1966 | Fitch et al. | 299/4 |
| 3,309,140 | 3/1967 | Gardner et al. | 299/5 X |
| 3,382,924 | 5/1968 | Veley et al. | 166/305 R |
| 3,482,636 | 12/1969 | Crowe | 166/307 |
| 3,556,221 | 1/1971 | Haws et al. | 166/305 R |
| 3,938,590 | 2/1976 | Redford et al. | 166/271 X |
| 4,079,783 | 3/1978 | Snavely et al. | 166/305 R X |
| 4,114,693 | 9/1978 | Foster et al. | 166/305 R |

FOREIGN PATENT DOCUMENTS

500608  3/1954  Canada ............ 166/307

*Primary Examiner*—Stephen J. Novosad
*Assistant Examiner*—George A. Suchfield
*Attorney, Agent, or Firm*—C. A. Huggett; Drude Faulconer

[57] ABSTRACT

A method of treating a subterranean formation which has undergone an in situ leaching operation which utilzed an ammonium solution as the lixiviant. In such a leach operation, ammonium ions will exchange into the clay in the formation and will present a threat of contamination to any ground waters that may be present in the formation. The present method involves flushing the formation with a halogenated restoration fluid, e.g., chlorinated water having a halogen therein which reacts with ammonia within the formation to decompose the ammonia to nitrogen. The halogenated restoration fluid can be continuously injected or it can be injected as a slug followed by a relatively halogen-free solution to complete the operation. The ammonia concentration of the produced fluids is monitored and when it drops below a desired value, the method is complete.

18 Claims, 1 Drawing Figure

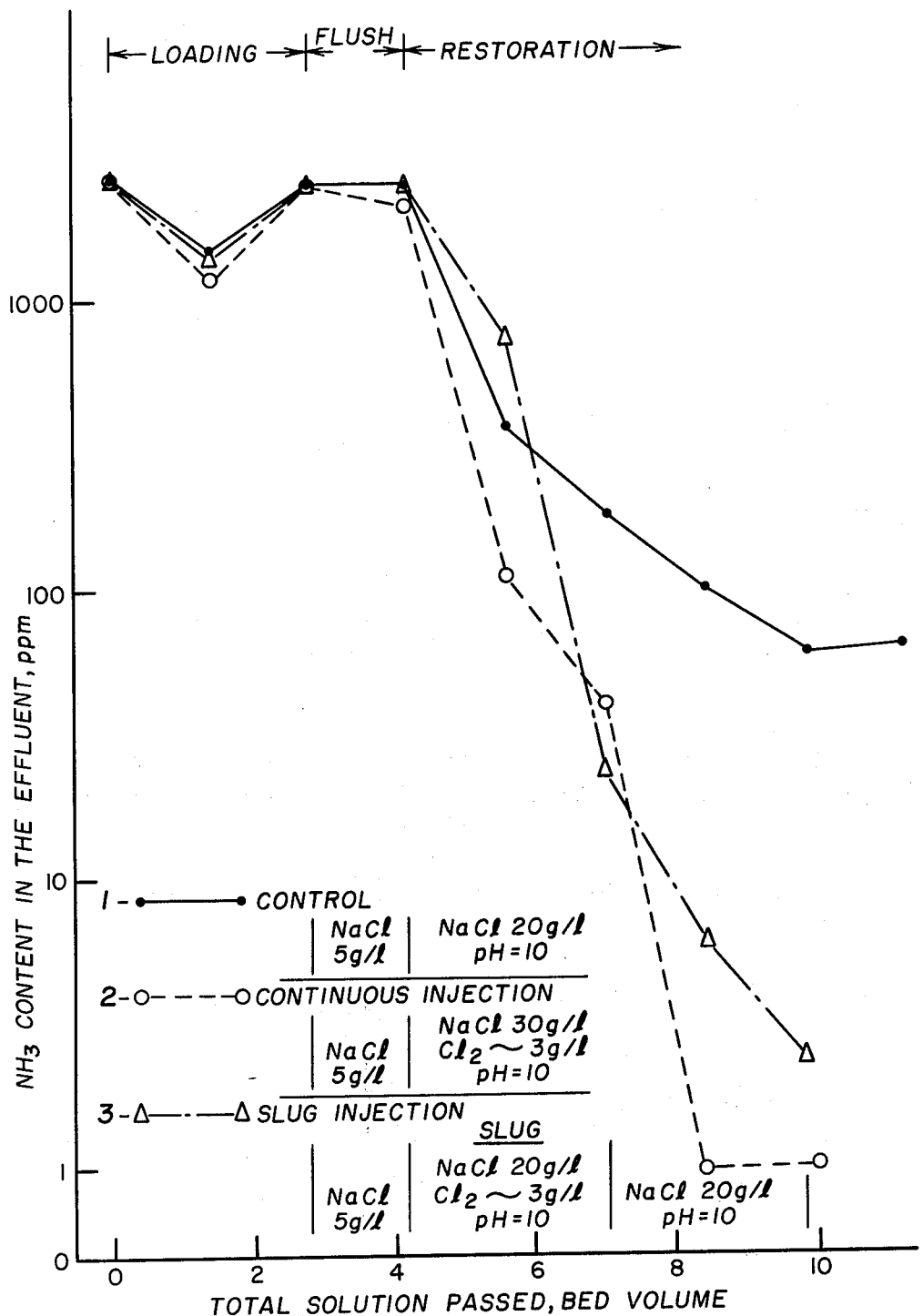

METHOD OF TREATING FORMATION TO REMOVE AMMONIUM IONS

BACKGROUND OF THE INVENTION

The present invention relates to a method for restoring a subterranean formation which may have become contaminated during an in situ leach operation and more particularly relates to a method of removing contaminants, i.e., ammonium ions, from a subterranean clay-containing formation after an in situ leach operation to restore the purity of any ground waters that may be present in the formation.

In a typical in situ leach operation, wells are completed into a mineral or metal value bearing (e.g., uranium) formation and a lixiviant is flowed between wells to dissolve the desired values into the lixiviant. The pregnant lixiviant is produced to the surface where it is treated to recover the desired values from the lixiviant. Unfortunately, many known, highly effective lixiviants not only leach the desired values from the formation but, also, they react with certain formations to give up chemical substances which remain in the formation after the lixiviants pass therethrough. Where the formation also contains ground waters and/or a water source which would otherwise be fit for human and/or animal consumption, these chemical substances will likely create a substantial contamination problem for this water. If this be the case, the formation must be treated after a leach operation to remove these contaminants to restore the purity of the water.

One method for improving the purity of a contaminated water source is to merely pump the water from the formation until the contaminant reaches an acceptably low level. Another, simple method is to pump uncontaminated water through the formation to flush out the contaminants. These methods work well where the contaminants are soluble and are not exchanged by some component of the formation from which it can only be released at a very slow rate. If the contaminants are exchanged by the formation, extremely large volumes of water must be used to adequately restore the formation.

In many known uranium and related value bearing formations, a substantial part of the formation matrix is comprised of calcium-based clays (e.g., smectite). This type formation presents a real formation water contamination problem when a known, highly effective lixiviant comprised of an aqueous solution of ammonium carbonate and/or bicarbonate is used to leach the desired values from the formation. Here, the ammonium ions from the lixiviant are exchanged into the smectite clays in the formation which make their removal by flushing with ground water a very slow and extended process.

One method for removing ammonium ions from a formation following a uranium leach operation is disclosed in U.S. Pat. No. 4,079,783, issued Mar. 21, 1978, and in copending U.S. application Ser. No. 824,686, filed Aug. 15, 1977, wherein a restoration fluid comprising an aqueous solution of a strong, soluble, alkaline compound is flowed through the formation to convert ammonium ions to an un-ionized form, i.e., ammonia ($NH_3$), which, in turn, can easily be flushed from the formation. However, while this approach achieves a good result, it requires a substantial amount of alkaline compound, e.g., lime or sodium hydroxide, and produces a large quantity of waste water containing calcium and ammonia which has to be properly disposed of at the surface.

Further, the ion exchange between the ammonium ions and the cations in the aqueous alkaline solution takes place according to the mass action law. Consequently, the rate of ammonium ion removal becomes slower and slower as more and more of the ammonium ions are removed. This makes the last or residual ammonium ions very difficult to remove. In order to meet certain governmental requirements (e.g., Texas requires no more than 3 parts per million level of ammonia in the formation water), it has been estimated that approximately 99.5 percent of the ammonium ions in a contaminated clay formation has to be exchanged by cations from the restoration fluid. This obviously requires a considerable amount of alkaline solution to be handled to restore the formation to the required specifications. Also, the ammonia content of the recovered restoration fluid requires this fluid to be treated to remove the ammonia before the fluid can be used to make up fresh restoration fluid for recycle or before it can otherwise be disposed of.

SUMMARY OF THE INVENTION

The present invention provides a method of removing a contaminant, i.e., ammonium ions ($NH_4^+$) from a formation containing clay. Specifically, the formation is treated with a halogenated restoration fluid preferably comprised of chlorinated water and/or hypochlorite solution to quickly and completely restore the formation to an ecologically acceptable level. Further, the produced fluids in the present method (while they may contain ammonia) can readily be used to make up fresh restoration fluid for recycle without requiring an additional treating operation.

In leaching a formation containing clay with an ammonium carbonate and/or bicarbonate lixiviant, ammonium ions are exchanged into the clay and will slowly desorb into the ground waters in the formation, thereby contaminating same. In accordance with the present invention, after a leach operation has been completed, a halogenated restoration fluid preferably comprised of chlorinated water and/or a hypochlorite solution is flowed through the formation between wells previously used during the leach operation.

There are equilibria existing between ammonia ($NH_3$) and ammonium ions ($NH_4^-$) in the formation water and between the ammonium ions in the clay and ammonium ions in the formation water. The chlorine in the restoration fluid forms hypochlorite which in turn reacts with the ammonia in the formation water and through a sequence of chemical reactions decomposes the ammonia into ecologically harmless water and nitrogen. This in situ decomposition of the ammonia breaks it from re-equilibration with the ammonium ions in the clay allowing more ammonium ions to desorb into the water to be converted to ammonia and so on. This process will continue as long as chlorine is added or until there is substantially no ammonia remaining in the formation water.

The fluids produced during the early part of the restoration cycle will contain substantial amounts of ammonia since this is formation water which has been pushed out of the formation as a slug by the initial injection of restoration fluid and has actually not been in substantial contact with the chlorine in the restoration fluid. In the present invention, however, even these early produced fluids can be used to make up fresh restoration fluid for recycle if it is desired. Chlorine and/or hypochlorite is added thereto and, as will be explained in more detail later, this chlorine will decompose the ammonia in the produced fluids during the makeup procedure.

In order to improve the efficiency of the present method, the pH of the chlorinated restoration fluid may be adjusted to within the range of 7 to 13 by adding a base, e.g., sodium or calcium hydroxide. At the higher pH, the ammonium ions in the formation are converted to ammonia at a faster rate and, accordingly, increases the contact rate between ammonia and chlorine from the restoration fluid.

In the present invention, the chlorinated restoration fluid is injected in a well previously used for the leach operation and fluids are produced from another well. The restoration fluid can be continuously injected until the ammonia concentration in the produced fluid drops below the desired level or the chlorinated restoration can be injected as a slug and followed by a substantially chlorine-free flushing fluid to complete the operation. Since chlorine is used in the disinfection of many municipal water supplies, the present invention presents no ecological problems even if some exclusion outside the contaminated formation occurs.

BRIEF DESCRIPTION OF THE DRAWING

The FIGURE is a graph showing experimental results of ammonium ion removal from a clay-bearing sand in accordance with the present invention by plotting ammonia concentration in the effluent against the number of bed volumes of restoration fluid passed through the sand.

DESCRIPTION OF THE PREFERRED EMBODIMENTS

In a typical in situ leach operation for recovering uranium and/or related values, wells are completed into a uranium or other value bearing formation and a lixiviant is flowed between the wells. The uranium and/or related values are dissolved into the lixiviant and are produced therewith to the surface where the pregnant lixiviant is treated to recover the desired values. For an example of such a leach operation, see U.S. Patent application Ser. No. 712,404, filed Aug. 6, 1976.

In many known formations where an in situ leach such as mentioned above is carried out, a substantial part of the formation matrix is comprised of calcium-based clays (e.g., smectite). When a desired, highly effective lixiviant, i.e., ammonium carbonate and/or bicarbonate, is used in the leach operation, ammonium ions ($NH_4^+$) are exchanged into and strongly held by the clays and remain in the formation after the leach operation is completed. These ammonium ions slowly dissolve into any ground water that may be present in the formation and thereby pose a contamination threat to the water source.

Clays are complex compounds comprised of calcium, magnesium, aluminum, silicon, and oxygen. They are capable of exchanging calcium ions for other ions in much the same way as do commercial ion exchange resins used for softening water. This property of clays is illustrated by the equation:

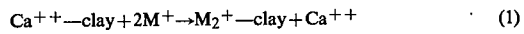

$$Ca^{++}-clay + 2M^+ \rightarrow M_2^+-clay + Ca^{++} \qquad (1)$$

where $M^+$ is another cation.

The ammonium ion ($NH_4^+$) is strongly exchanged by clays so that $NH_4^+$ is bound into the clay lattice:

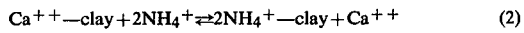

$$Ca^{++}-clay + 2NH_4^+ \rightleftharpoons 2NH_4^+-clay + Ca^{++} \qquad (2)$$

The clay and aqueous solution constituting its environment are in equilibrium, i.e., reaction (2) is reversible. If $NH_4^+$ in the solution, e.g., formation water, is decreased, $NH_4^+$ will come off the clay and the calcium ion ($Ca^{++}$) will go back on. However, the clay-$NH_4^+$ equilibrium is such that only a very small amount of $NH_4^+$ in solution will maintain a large amount of $NH_4^+$ on the clay, i.e., the clay prefers $NH_4^+$ to $Ca^{++}$. This is the reason that $NH_4^+$ is only very slowly released by flushing the clay with water containing only neutral, dissolved salts.

In accordance with the present invention, the contaminated space (a "pore volume") of the formation is treated with a halogenated restoration fluid preferably comprising chlorinated water and/or a hypochlorite solution, e.g., NaOCl, to decompose ammonium ions in the formation to components, e.g., $N_2$, $H_2O$, which, in turn, offer no contamination threat to the formation. The restoration fluid is injected into one of the wells previously used in the leach operation and fluids are produced from another until the ammonia concentration in the produced fluids reaches an acceptable level. The produced fluids are made up with additional chlorine and/or hypochlorite solution for recycle as fresh restoration fluid. When the ammonia content of the produced fluids drops below an ecologically satisfactory level, e.g., 3 parts per million indicating that substantially all of the ammonium ions have been removed or converted in the formation, injection of the restoration fluid is stopped and the restoration of the formation is complete.

As stated above, there are equilibria existing between $NH_4^+$ in the clay and $NH_4^+$ in the formation water, see Equation (2), and also between $NH_3$ and $NH_4^+$ in the formation water, the latter being:

$$NH_4^+ + OH^- \rightleftharpoons NH_3 + H_2O \qquad (3)$$

When chlorine ($Cl_2$) in the restoration fluids contacts the $NH_3$ in the formation water, the following sequence of reactions occur:

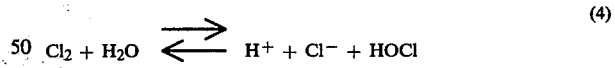

$$Cl_2 + H_2O \rightleftharpoons H^+ + Cl^- + HOCl \qquad (4)$$

$$HOCl \rightleftharpoons H^+ + OCl^- \qquad (5)$$

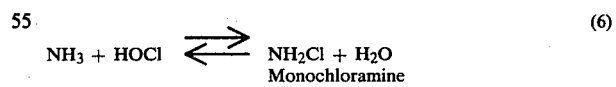

$$NH_3 + HOCl \rightleftharpoons \underset{\text{Monochloramine}}{NH_2Cl} + H_2O \qquad (6)$$

$$NH_2Cl + HOCl \rightleftharpoons \underset{\text{Dichloramine}}{NHCl_2} + H_2O \qquad (7)$$

$$NHCl_2 + HOCl \rightleftharpoons \underset{\text{Trichloramine}}{NCl_3} + H_2O \qquad (8)$$

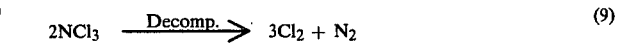

$$2NCl_3 \xrightarrow{\text{Decomp.}} 3Cl_2 + N_2 \qquad (9)$$

The effect of $Cl_2$ is to react away the ammonia to break it from re-equilibration with $NH_4^+$, which in turn reequilibrates with clay. That is, as the $NH_3$ and hence $NH_4^+$, see Equation (3), in the formation water is decomposed, $NH_4^+$ from the clay replaces the converted $NH_4^+$ in the water and there the $NH_4^+$ becomes $NH_3$ which, in turn, is contacted and decomposed by more chlorine from the restoration fluid. Sufficient chlorinated restoration fluid is injected until substantially all $NH_4^+$ in the formation is decomposed. This is determined by monitoring the $NH_3$ concentration in the produced fluids.

The $NH_3$ concentration in the produced fluids during the early part of the operation will be relatively high and decreases to a value almost undetectable in the final stages. However, even the early produced fluids can be used to make up fresh restoration fluid for recycle by adding chlorine and/or hypochlorite thereto to bring it back up to strength if it is so desired. The added chlorine attacks the $NH_3$ in the produced fluid during makeup in the same manner as that which occurs in the formation to decompose the $NH_3$ in the produced fluids. This permits a "closed cycle" to be used during the restoration operation which eliminates the necessity of excessive handling and/or disposal of large quantities of ammonia-contaminated produced fluids at the surface.

The chlorinated restoration fluid can be made up at the surface prior to injection into a well by bubbling chlorine gas into water and/or the produced fluids in a mixing tank. Also, if a hypochlorite, e.g., NaOCl, is used, this solid compound can also be dissolved into water and/or produced fluids in a mixing tank at the surface. If chlorine gas is used, it can also be mixed with the water and/or produced fluids downhole in the well just before the restoration fluid enters the contaminated formation. A method and apparatus for mixing a gas and a liquid at a downhole location is fully described in copending U.S. application Ser. No. 846,863, filed Oct. 31, 1977.

In order to improve the rate efficiency of the present process, the pH of the chlorinated water and/or hypochlorite restoration fluid can be adjusted with a base, e.g., $Ca(OH)_2$ or NaOH, to a value of 7 to 13. At the higher pH, more $NH_4^+$ from the clay is converted faster to $NH_3$, see Equation (3). In addition, the reaction produces HCl, see Equation (4), and this acid tends to neutralize the base used to adjust the pH. Although chloride is preferred, other halogens, such as bromide and iodine, will also convert $NH_4^+$ in the same manner and may be used in the restoration fluid if the situation dictates. Fluorine will also react with the $NH_4^+$ but, due to undesirable side reactions in many actual restoration operations, it is likely to be the least preferable of the halogens in most field operations.

To further illustrate the invention, the following experimental data is set forth:

Three columns were packed with 18 cc (23.4g) each of rich uranium, clay-containing ore from South Texas with 100–200 mesh fine quartz at both the top and the bottom to insure uniform flow of the liquid through the bed.

Each column was first loaded with $NH_4^+$ by passing 2.8 bed volume (BV) of simulated leach solution with the following nominal composition:

| Component | Grams per liter (g/l) |
|---|---|
| NaCl | 5.0 |
| $NH_4HCO_3$ | 3.0 |
| $NH_4OH$ | 5.8 |

The pH of the solution was 9.44 and the actual $NH_3$ content was found to be 2670 ppm.

The loaded columns were then flushed with 1.4 BV of brine solution (5 g/l of NaCl, pH=8), simulating the connate water normally present in the natural formation.

The three columns were then restored as follows:

(1) Control (column #1): The column was flushed using the restoration fluid containing 20 g/l of NaCl at pH=10.

2) Continuous injection of chlorinated water (column #2): The column was continuously flushed with the chlorinated water described above.

(3 Slug injection of chlorinated water (column #3): To simulate slug injection, 2.8 BV of the chlorinated water was injected. This was followed by injection of substantially chlorine-free water which could be connate water in an actual operation. The chlorinated water used in both columns #2 and #3 was prepared by saturating a brine solution having 20 g/l of NaCl with $Cl_2$ at atmospheric pressure with the pH of the chlorinated solution adjusted from 2 to 10 using a caustic solution.

The process was followed by collecting samples every 1.4 BV analyzing for pH and $NH_3$. $NH_3$ was determined using an ammonia electrode, Orion Model 95-10, manufactured by Orion Research Inc. This is a method acceptable to Federal and State agencies.

The chlorine content of the chlorinated water was not analyzed. If it were really saturated, the chlorine content would be estimated to be 0.045 mole/l or 3.2 g/l.

The results of the above experiments are plotted on the graph of the Figure with the ammonia content of the effluents, i.e., produced fluids, being plotted against the total bed volumes of restoration fluid passed through a respective column. It can be seen that after injection of 4 BV of chlorinated restoration fluid in the continuous mode (column #2 in graph), the $NH_3$ content in the effluent was down from 2000 ppm to 1 ppm. To achieve a level of 5 ppm, less than 3 BV was required. On the other hand, the $NH_3$ content of the effluent of the control run (column #1 in graph) was still 100 ppm after 4 BV of the restoration fluid.

In column #3 (column #3 in graph), the restoration fluid was switched to chlorine-free solution after injection of 2.8 BV of chlorinated restoration fluid. The ammonia content of the effluent at total BV of 5 (2.8 and 2.2 for chlorinated and chlorine-free solutions, respectively) was 3 ppm. This indicates that the chlorinated restoration fluid can be injected in the form of a slug followed by a chlorine-free flushing fluid, e.g., connate water, to substantially reduce the cost of the restoration operation.

The chemistry involved in the present process is not completely understood. The stoichiometry from the above equations indicates that it takes 1.5 mole of $Cl_2$ to decompose 1 mole of $NH_3$ or 6.3 pounds of $Cl_2$ per pound of $NH_3$. In actual field operations it may take somewhat more chlorine to compensate for potential side reactions. However, the experimental data revealed that a lesser amount, i.e., approximately 3 pounds of chlorine per pound NH$_3$, was actually needed. This indicates that the actual conditions of the formation to be restored need to be considered in finalizing the amounts of chlorine needed to be added to a particular restoration fluid.

The present invention provides a safe and relatively quick method for restoring an ammonium-contaminated, clay formation which does not require excessive handling and/or disposal of contaminated produced fluids at the surface. Further, since chlorine is used in disinfecting municipal water supplies, the present invention offers little, if any, ecological risks even if the restoration fluid flows outside the contaminated area.

What is claimed is:

1. A method of treating a subterranean clay-containing formation having ammonium ions absorbed on the clay, the method comprising:
   flushing said formation with a halogenated restoration fluid having a halogen therein which reacts with ammonia in the formation to decompose said ammonia.

2. The method of claim 1 wherein said halogenated restoration fluid comprises:
   chlorinated water.

3. The method of claim 1 wherein said halogenated restoration fluid comprises:
   an aqueous solution of a hypochlorite salt.

4. The method of claim 3 wherein said hypochlorite salt is sodium hypochlorite.

5. The method of claim 1 including:
   adjusting the pH of the halogenated restoration fluid to within the range of 7 to 13 by adding an alkaline hydroxide.

6. The method of claim 5 wherein said alkaline hydroxide is sodium hydroxide.

7. The method of restoring a subterranean clay-containing formation which has been leached with an ammonium solution, said formation having at least one injection well and at least one production well, said method comprising:
   injecting a halogenated restoration fluid having a halogen therein through said at least one injection well;
   flowing said halogenated restoration fluid through said formation to react said halogen with ammonia within said formation to decompose said ammonia into nitrogen;
   producing fluids from said formation through said at least one production well; and
   monitoring the ammonia concentration in said produced fluids.

8. The method of claim 7 including:
   ceasing the injection of said halogenated restoration fluid when said ammonia concentration in said produced fluids drops below a desired level.

9. The method of claim 8 wherein the said halogenated restoration fluid is continuously injected until said ammonia concentration in said produced fluids drops below said desired level.

10. The method of claim 8 wherein said halogenated restoration fluid is injected as a slug followed by the injection of a relatively halogen-free solution until said ammonia concentration in said produced fluids drops below said desired level.

11. The method of claim 7 wherein said halogenated restoration fluid comprises:
    an aqueous solution of a hypochlorite salt.

12. The method of claim 11 wherein said hypochlorite salt is sodium hypochlorite.

13. The method of claim 7 wherein said halogenated restoration fluid comprises:
    chlorinated water.

14. The method of claim 13 wherein said chlorinated water is formed by bubbling chlorine gas through water.

15. The method of claim 13 wherein said chlorinated water is formed by bubbling chlorine gas through water at a downhole location within said at least one injection well.

16. The method of claim 7 including:
    adjusting the pH of said halogenated restoration fluid to within the range of 7 to 13 by adding an alkaline hydroxide.

17. The method of claim 16 wherein said alkaline hydroxide is sodium hydroxide.

18. The method of claim 7 including:
    using at least a portion of the produced fluids to make up said halogenated restoration fluid for recycle in said method.

* * * * *